Dec. 24, 1957  E. G. BIANCA  2,817,447
SHUNTING ARRANGEMENTS FOR MOVING VEHICLES OR THE LIKE
Filed July 27, 1955  7 Sheets-Sheet 1
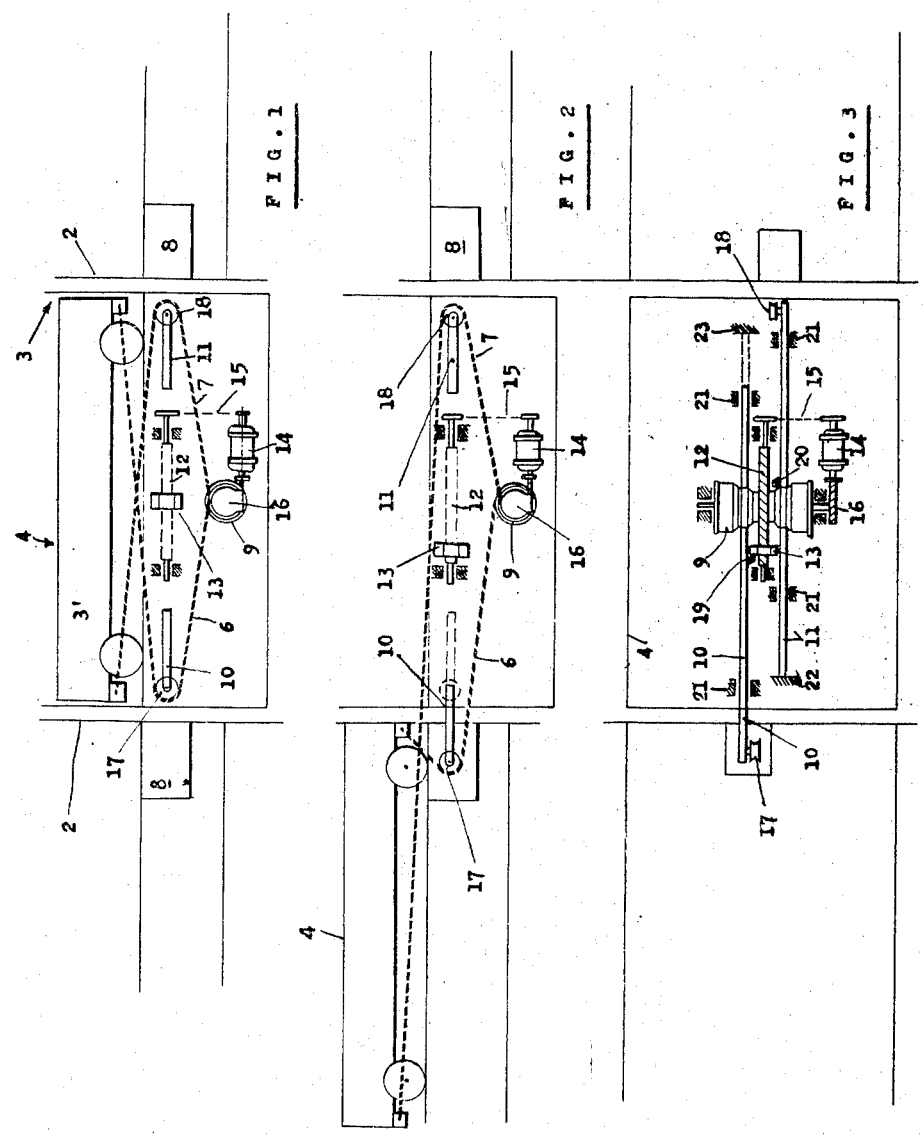
INVENTOR.
Edoardo Giuseppe Bianca
BY
Michael S. Striker
agt.

Dec. 24, 1957  E. G. BIANCA  2,817,447
SHUNTING ARRANGEMENTS FOR MOVING VEHICLES OR THE LIKE
Filed July 27, 1955  7 Sheets-Sheet 2

INVENTOR.
Edoardo Giuseppe Bianca
BY
Michael S. Striker
agt.

Dec. 24, 1957 E. G. BIANCA 2,817,447
SHUNTING ARRANGEMENTS FOR MOVING VEHICLES OR THE LIKE
Filed July 27, 1955 7 Sheets-Sheet 3

*INVENTOR.*
Edoardo Giuseppe Bianca
BY
Michael S. Striker
agt.

Dec. 24, 1957     E. G. BIANCA     2,817,447
SHUNTING ARRANGEMENTS FOR MOVING VEHICLES OR THE LIKE
Filed July 27, 1955     7 Sheets-Sheet 4
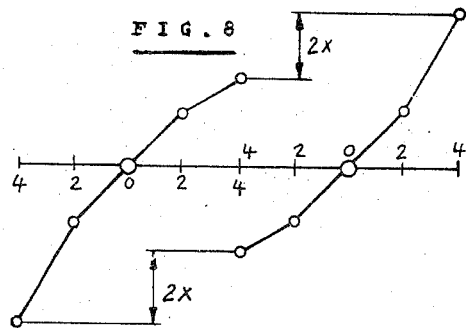
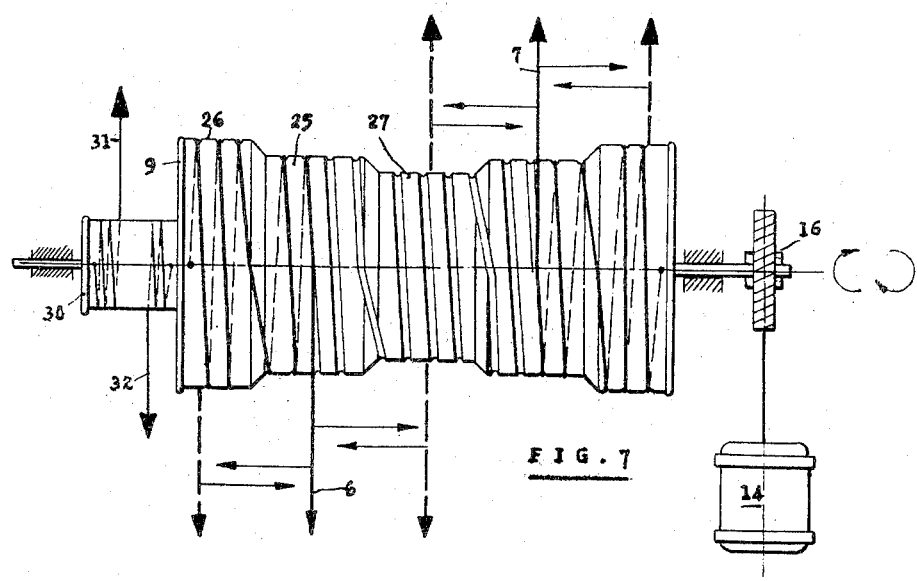
INVENTOR.
Edoardo Giuseppe Bianca
BY
Michael S. Striker
agt.

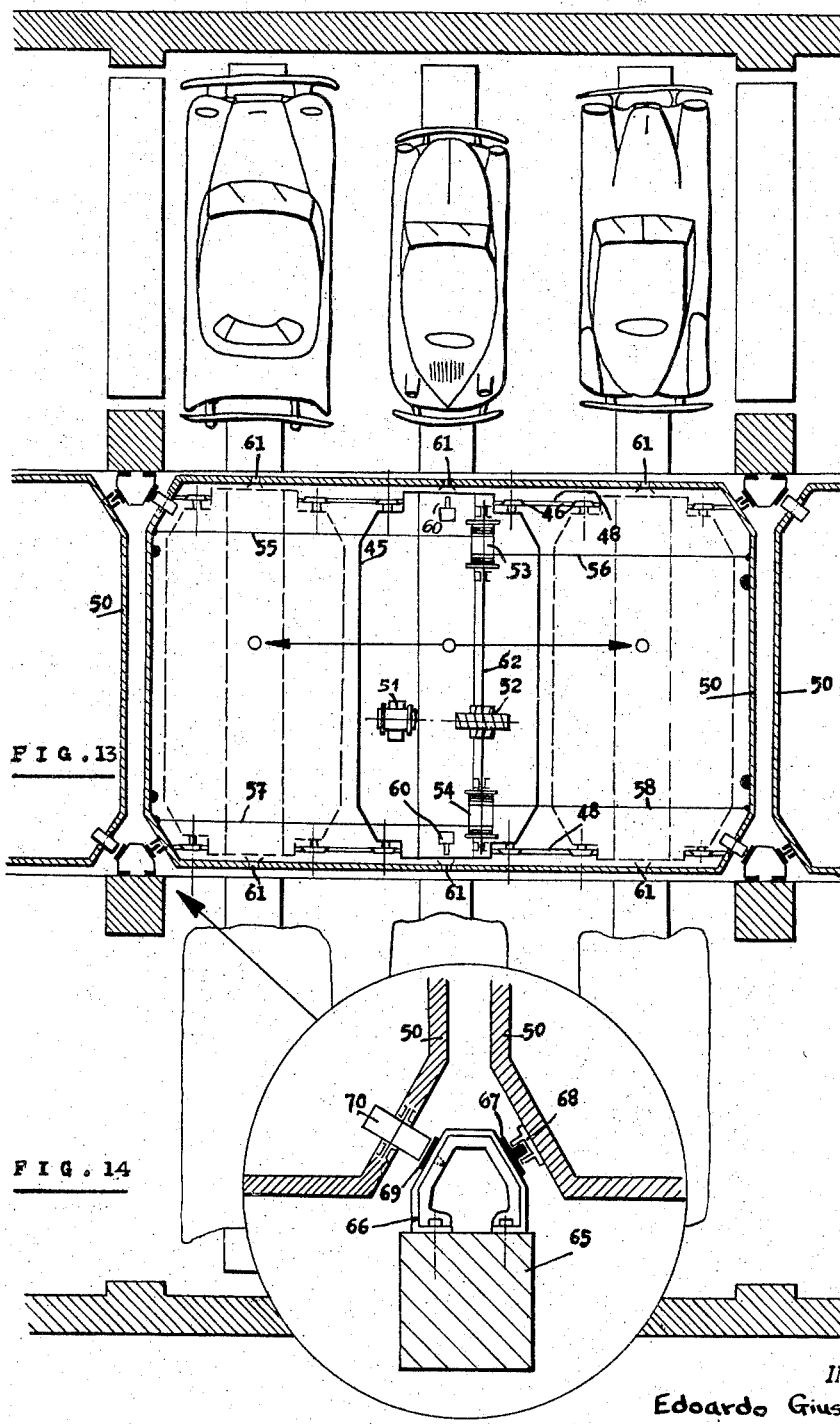

United States Patent Office 2,817,447
Patented Dec. 24, 1957

2,817,447

SHUNTING ARRANGEMENTS FOR MOVING VEHICLES OR THE LIKE

Edoardo Giuseppe Bianca, Herrliberg, near Zurich, Switzerland, assignor to Sicomatic A. G., Zurich, Switzerland Application July 27, 1955, Serial No. 524,713

Claims priority, application Austria July 27, 1954

8 Claims. (Cl. 214—95)

The present invention relates to improvements in shunting arrangements for automatically moving vehicles or any other goods which are conveyed in an elevator cabin, into or from a contiguous chamber with the aid of a platform carriage or parking machine which is conveyed in said cabin together with said vehicle or goods.

I have already proposed, for the purpose of mechanically parking vehicles and the like, to place same in cells which are disposed in side-by-side and superjacent relation in the manner of a building, the vehicles being transported to their parking points by a horizontally movable elevator means.

Arrangement of this type are known in which said platform carriage switches or shunts the vehicle by means of two ropes which are trained over guide rollers secured to the cabin end and wound up in opposite directions on a rope drum. Such known arrangement, however, has the disadvantage that the platform carriage in the entirely expelled condition is still partly situated within the elevator cabin, whereby its useful loading area or surface is reduced so that the width of the shaft and, thus, that of the building has to be increased.

As disclosed in the present invention, the shunting arrangement also is disposed directly in the elevator cabin and also comprises a rope drum with ropes wound up in opposite directions, but these ropes are trained over movable, i. e. dischargeable or expellable guide rollers. By reason of simultaneously expelling the latter, the platform carriage may be moved out of the cabin and into the parking chamber by any desired amount to either side, depending on the direction of rotation of the rope drum.

Figure 4:
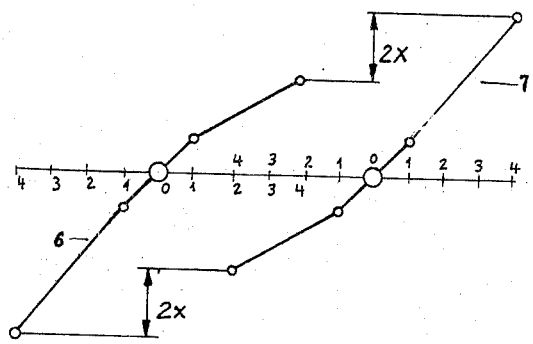
Figure 5:
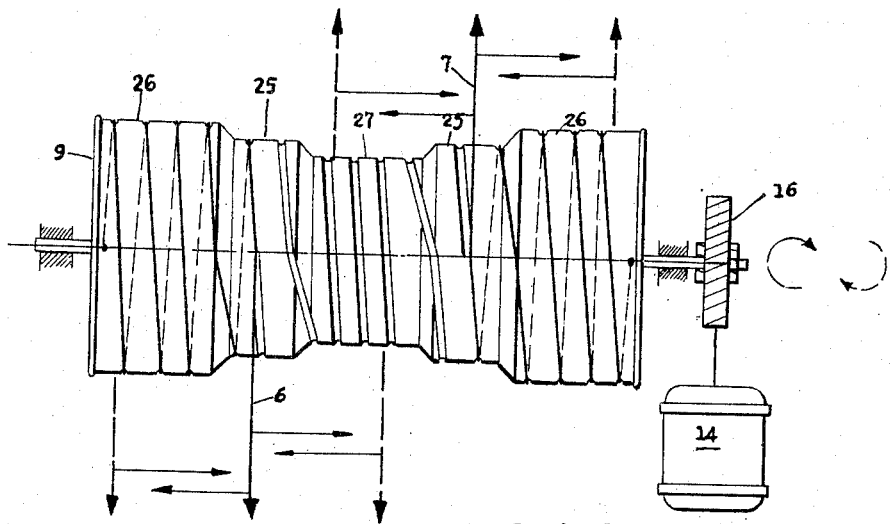
Figure 6:
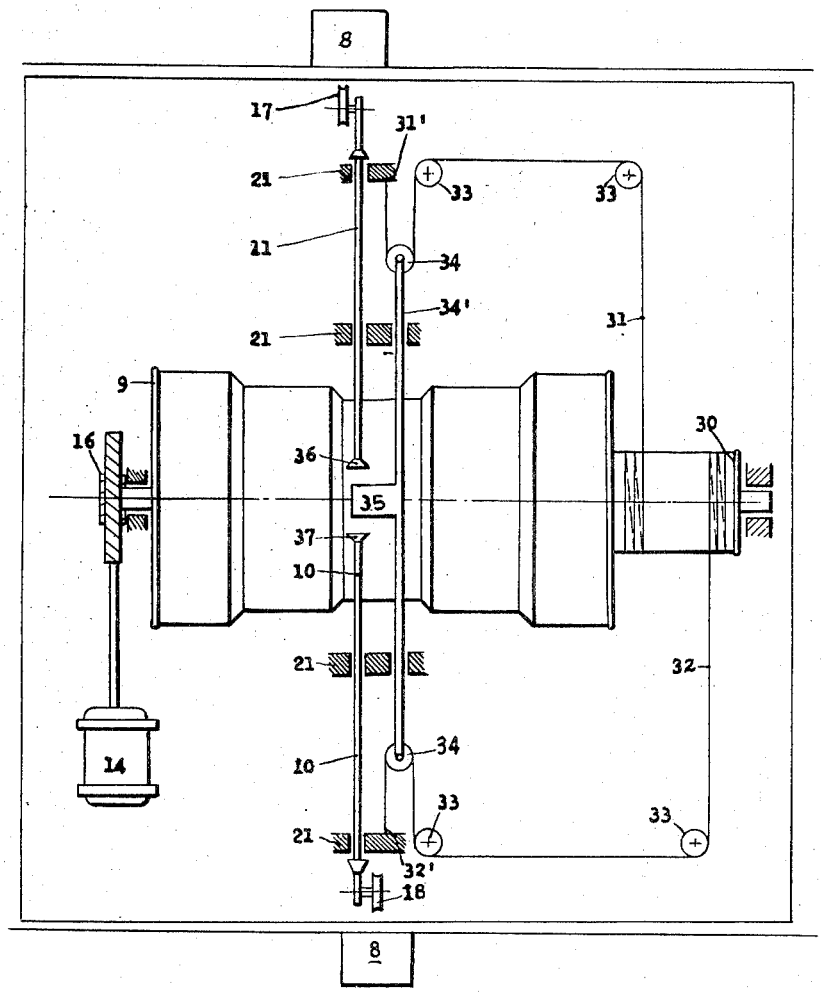

A plurality of forms of invention are shown in the accompanying drawings, in which:

Figs. 1 and 2 illustrate the fundamental disposition of the shunting arrangement in the intermediate or inactive position, i. e. within the elevator cabin and in the fully expelled position respectively, Fig. 3 shows in plan the mechanical means and the additional spindle-and-nut expelling means, Fig. 4 shows schematically the rope winding up and unwinding lengths with reference to the drum revolutions and as caused by the stepped drum, Fig. 5 depicts the rope guiding means on a stepped rope drum, Fig. 6 illustrates a further form of actuation of the additional guide roller expulsion means operating with the aid of second or auxiliary drum connected to the stepped main drum and of a second pair of ropes wound up in opposite directions.

Figure 9:
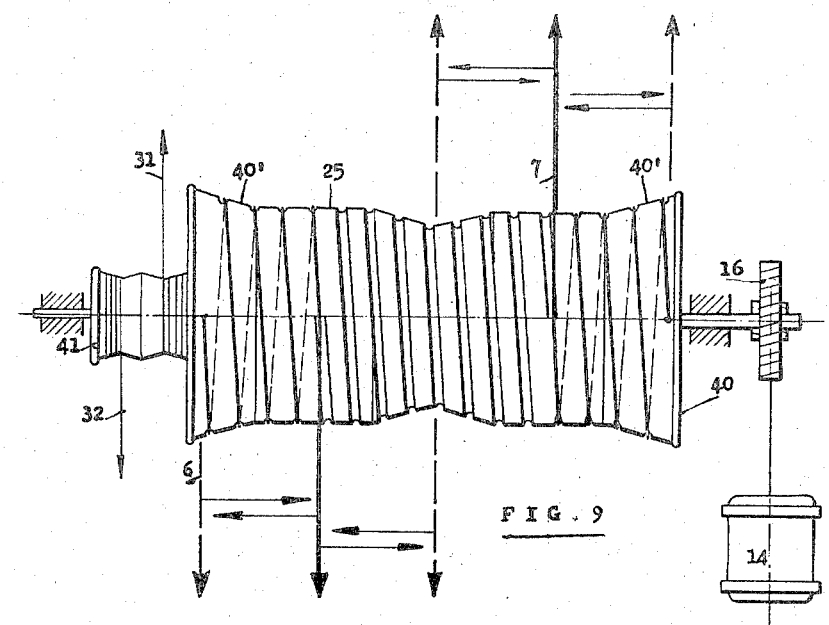
Figure 10:
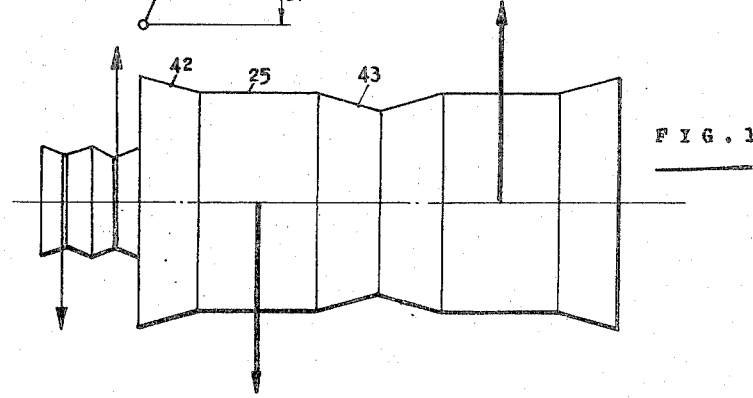

Fig. 7 depicts the arrangement and the rope guiding means of a stepped main drum having an integral auxiliary drum for the additional expulsion step, Fig. 8 shows the diagram of rope movement pertaining to the stepped drum shown in Fig. 7 but in which the commencement of expulsion is timed differently from Fig. 5, Fig. 9 illustrates a combined stepped and tapered rope drum with a double-cone auxiliary expulsion drum, Fig. 10 shows a schematic representation of Fig. 9.

Figure 11:
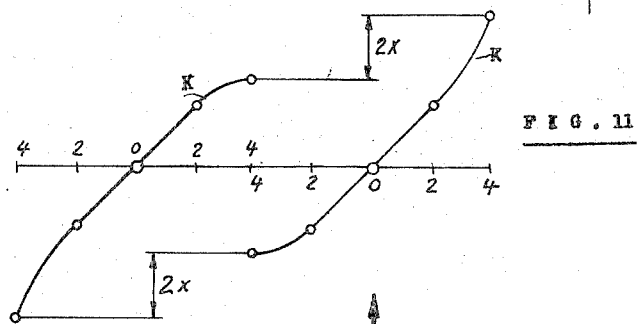
Figure 12:
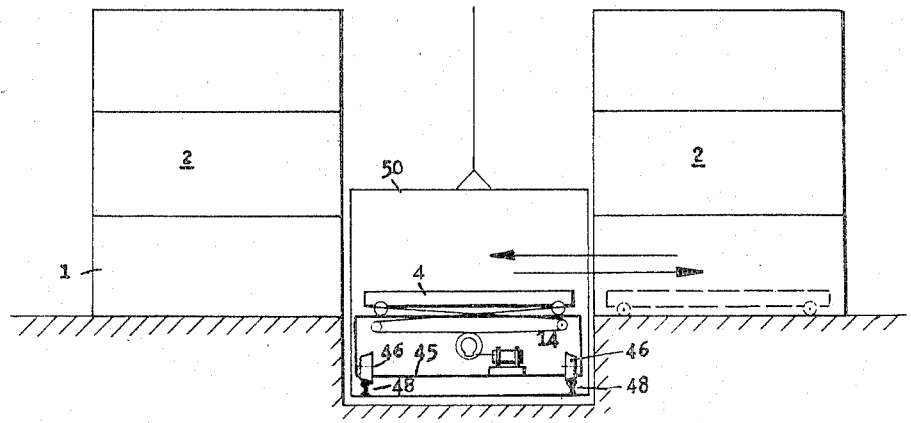

Fig. 11 shows a rope movement diagram pertaining to Figs. 9 and 10,

Fig. 12 shows a second form of the shunting arrangement provided with crosswise trained ropes, Fig. 13 depicts in plan an example of application for the two-sided arrangement of a parking chamber for three vehicles each, and the appurtenant elevator cabin disposition with traversing driving and locking means, and Fig. 14 shows a detail of the appurtenant elevator cabin guide means and stabilizing means.

In Fig. 1 a first form of the invention is shown. Between two rows 2 of parking chambers a corridor is provided in which one or more elevator means 3 are disposed which may be stationary or horizontally movable in said corridor. The construction of said elevator means is not shown in detail in the drawings, but may comprise a transport tower, transport crane, stationary elevator, sliding platform or the like. In the cabin 3 is disposed a platform carriage 4 of which the construction forms the present invention.

For expelling the platform carriage 4, a specially constructed stepped rope drum 9 is provided on to which are wound two ropes 6 and 7 in opposite directions. The latter are trained over guide rollers 17 and 18 which are secured to axially movable slide rods 10 and 11. At any one time, only that slide rod is expelled which is situated in the direction of expulsion in order to thereby effect the additional expulsion from the cabin. In the parking structure are provided recesses 8 for accommodating the expelled slide rod. Another possibility resides in making the slide rods flat and expelling same between a bottom 3' and the platform carriage 4.

The additional expulsion step requires an increased rope unwinding length during the expulsion period. The additional length of rope results from the different diameters of the winding and unwinding rope drum parts. To such end, at least one step is required, i. e. the drum must have at least two different diameters. Practice has shown that two steps, i. e. a drum having three diameters is of greater advantage, since thereby the height of step is halved. The two movements, i. e. the principal shunting and the additional expulsion are brought about by a motor 14. Rope drum 9 via a directly coupled gearing 16 such as a worm gearing, is connected to motor 14, and the slide rods 10, 11 are actuated by the latter through a chain drive 15 which in turn drives a spindle 12. The latter moves a nut 13 in the longitudinal direction.

In the intermediate position of platform carriage 4 shown in Fig. 1, nut 13 also is situated in the middle and, depending on the direction of expulsion, moves to the right or left to the stops 19 or 20 which are secured to the slide rods 10 and 11 respectively, which in turn carry the guide rollers 17 and 18.

Between nut 13 in its intermediate position and the stops 19 and 20 is a certain play so that the additional expelling means are not actuated at once at the beginning of the shunting movement but rather after a certain time, for example then when total displacement has been carried out from ¼ to ¾. In this way, the additional expulsion means are not loaded by the accelerating forces which usually surpass the rolling resistance from 300 to 500 percent. The additional expulsion means thus may be made lighter and at lower costs.

During the return movement of carriage 4, guide roller 17 which has been expelled through slide rod 10, is unloaded under all circumstances since, in such case, the load affects only the opposite guide roller 18 which is secured to slide rod 11 which abuts against a stationary stop 22. Guides 21 serve for guiding the slide rods 10 and 11.

The stepped rope drum 9 is shown in detail in Fig. 5, and the rope runoff is schematically shown in Fig. 4. The drum is a three-step drum, although two steps would be sufficient. Drum 9 comprises an intermediate cylindrical portion 25 from which the rope is payed out, or on which the rope is collected in the intermediate position of the platform carriage 4, in which carriage 4 is located entirely in the elevator means 3 as shown in Fig. 1. As soon as drum 9 is rotated by motor 14, rope 6 is payed out and the other rope 7 taken in, for the time being, for example during one revolution, on the same diameter corresponding to drum portion 25. Upon reaching the end portion of said intermediate portion, rope 6 is collected on the larger diameter 26, and rope 7 on the smaller diameter, or vice-versa. At the same time, spindle nut 13 must abut against stop 19 or 20 respectively. From this moment and through a simple further rotation of motor 14, the rope payout becomes longer than the rope collection and, therefore, the length of rope required for the additional expulsion becomes available. It is easy to compute the corresponding differences in diameter of the stepped drum and to adapt same to the cases at hand by paying attention to the requisite expulsion lengths.

Upon return of the carriage 4, the operations follow each other in the reversed order. The winding-up rope is running at a higher speed than the payed-out rope and, thus, pushes the slide rod 10 or 11 again into the cabin so that the latter's stop 19 or 20 follows spindle nut 13 which returns at the same time, up to the point where the intermediate cylindrical portion of the drum is reached, whereupon the winding-up and paying-out lengths of the ropes turn equal. Slide rod 10 thereby is pushed back into its initial position and nut 13 begins to move away from stop 19 or 20.

By virtue of the symmetrical arrangement, the two-sided construction functions identically, only the direction of rotation of the motor having to be reversed. The operation of additional expulsion or retreat respectively, is entirely automatic without any switching apparatus, solely by virtue of simultaneous actuation of drum 9 and spindle 12 through motor 14.

In Fig. 4 is shown a diagram of the rope length ratios, the horizontal ordinate showing the drum revolutions while the wind-up and pay-out lengths of the ropes 6 and 7 are shown in the vertical direction. The diagram shows that when drum 9 rotates in one direction, the rope length difference is $2x$. In Fig. 6 is illustrated another form of actuation of the additional expulsion of the slide rods 10 and 11. Instead of initiating the additional expulsion through a spindle as in the preceding example, this here is done through a second or auxiliary drum 30 fixed to main rope drum 9 and via the ropes 31 and 32 which are wound up in opposite sense. Said ropes are trained over guide rollers 33 and traction rollers 34, the latter being secured to the opposite ends of a common slide rod 34'. In the center of the latter is provided a stop 35 and the rope ends at 31' and 32' are secured to the guides 21. Upon rotation of main rope drum 9, stop 35 performs exactly the same movements as spindle nut 13 in the preceding example, and actuates the stops 36 and 37 of the two slide rods 10 and 11, which in their turn carry the guide rollers 17 and 18. It is essential that also in this case the additional expulsion means is liberated of all acceleration forces and, thus, may be made very light in weight and is reliable in operation.

Figs. 7 and 8 again show the stepped main drum 9 and the auxiliary drum 30 in detail, as well as the rope pay-out diagram, the point of change to additional expulsion being fixed this time at 50% of the total shunting movement.

In Figs. 9–11 is shown the detail construction of a composite stepped and tapered drum 40. The latter also comprises an intermediate portion 25 in order to start the additional expulsion means only outside of the acceleration range. The additional length of rope, however, in this case is not attained by a constant difference in diameter as in the preceding examples, but by a progressive difference through collection or pay-out respectively, on conical faces 40'. Of course, the rope also in this case has to be guided in grooves.

In connection with a conical main rope drum is used a conical auxiliary rope drum for the additional expulsion, in order that the expulsion receives the same progressivity as the additional rope lengths. This is shown in the diagram of motion in Fig. 11 in that the additional expulsion period is represented not by a straight line but by a curve K.

Fig. 12 shows the fundamental disposition of a crosswise shunting arrangement which is necessary in those cases where vehicles have to be parked in or fetched from different points of the chamber without lateral movement of the elevator cabin.

The arrangement shown in Figs. 12 and 13 comprises a movable frame 45 which replaces the upper cabin floor mentioned in the preceding examples and serves as bed for the carriage 4 which has to be expelled. Said frame 45 may move inside the cabin at right angles to the direction of expulsion of carriage 4. Frame 45 through wheels 46 is mounted on rails 48 secured to the cabin floor.

The means for switching the frame 45 comprises a motor 51 which via a gearing 52 drives a shaft 62. The latter carries the rope drums 53 and 54 on to which are wound the ropes 55, 56 and 56, 57 respectively. The free ends of said ropes are anchored to the cabin frame 50. When starting motor 51, frame 45 and the drive means secured thereto are shifted.

When it is necessary that the expulsion discharge or entry respectively, of the vehicles or goods takes place at quite definite points, interlocking devices 60 have to be provided which are electromagnetically, pneumatically or hydraulically actuated and which locate the transport carriage alternatively at locking points 61 to be provided. In Fig. 13, the second longitudinal displacement means is shown by the example of a triple position, but may be used for any number of positions according to the given requirements.

In Fig. 14 is shown a detail of the guide means for the elevator cabin 50, which in particular is applicable in cases where a plurality of elevator cabins are disposed side by side. The cabin guiding means is secured to the building columns 65 by means of steel arches 66 and comprises rails 67 disposed diagonally with respect to the cabin and cabin guiding shoes 68. These guides with respect to lateral forces are free of reaction only when the load is situated in the intermediate position. As soon as the load is moved into one of the exterior positions, there results a dissymmetry of the forces with respect to the guides. In order to relieve the guides from such dissymmetry, guide rollers 70 and supportnig rails 69 are disposed in the second diagonal with respect to elevator cabin 4 which intercept the resulting tilting moment and keep same away from the main guiding means.

What I claim as new is:

1. In an apparatus for raising articles to and lowering the articles from a given elevation and for moving the articles into and out of a compartment at said elevation, in combination, elevator means for raising and lowering an article carried by said means; carriage means carried by said elevator means for horizontal movement with respect thereto outwardly from and inwardly toward said elevator means, said carriage means being adapted to engage an article for moving the same from said elevator means into a compartment and from the latter back into said elevator means; a stepped drum carried for rotation about its axis by said elevator means; a pair of cables wound respectively in opposite directions on said drum and respectively connected to opposed parts of said carriage so that when said drum is rotated said carriage is moved with respect to said elevator in a direction depending upon the direction of rotation of said drum; and additional means carried by said elevator means for moving said carriage means completely out of said elevator means into a compartment.

2. In an apparatus for raising articles to and lowering the articles from a given elevation and for moving the articles into and out of a compartment at said elevation, in combination, elevator means for raising and lowering an article carried by said means; carriage means carried by said elevator means for horizontal movement with respect thereto outwardly from and inwardly toward said elevator means, said carriage means being adapted to engage an article for moving the same from said elevator means into a compartment and from the latter back into said elevator means; a stepped drum carried for rotation about its axis by said elevator means; a pair of cables wound respectively in opposite directions on said drum and respectively connected to opposed parts of said carriage so that when said drum is rotated said carriage is moved with respect to said elevator in a direction depending upon the direction of rotation of said drum; a pair of pulleys repectively engaging said cables; and means opertively connected to said pulleys for shifting one or the other of said pulleys outwardly of said elevator means in dependence upon the direction of rotation of said drum.

3. In an apparatus for raising articles to and lowering the articles from a given elevation and for moving the articles into and out of a compartment at said elevation, in combination, elevator means for raising and lowering an article carried by said means; carriage means carried by said elevator means for horizontal movement with respect thereto outwardly from and inwardly toward said elevator means, said carriage means being adapted to engage an article for moving the same from said elevator means into a compartment and from the latter back into said elevator means; a stepped drum carried for rotation about its axis by said elevator means; a pair of cables wound respectively in opposite directions on said drum and respectively connected to opposed parts of said carriage so that when said drum is rotated said carriage is moved with respect to said elevator in a direction depending upon the direction of rotation of said drum; a pair of pulleys respectively engaging said cables; elongated, substantially horizontal bar means turnably carrying said pulleys and carried by said elevator means for shiftable substantially horizontal, longitudinal movement in opposite directions; and means cooperating with said bar means for shifting the same and one or the other of said pulleys therewith in a direction depending upon the direction of rotation of said drum.

4. In an apparatus for raising articles to and lowering the articles from a given elevation and for moving the articles into and out of a compartment at said elevation, in combination, elevator means for raising and lowering an article carried by said means; carriage means carried by said elevator means for horizontal movement with respect thereto outwardly from and inwardly toward said elevator means, said carriage means being adapted to engage an article for moving the same from said elevator means into a compartment and from the latter back into said elevator means; a stepped drum carried for rotation about its axis by said elevator means; a pair of cables wound respectively in opposite directions on said drum and respectively connected to opposed parts of said carriage so that when said drum is rotated said carriage is moved with respect to said elevator in a direction depending upon the direction of rotation of said drum; a pair of pulleys respectively engaging said cables; a pair of elongated substantially horizontal bars turnably carrying said pulleys and respectively carried by said elevator means for shiftable substantially horizontal, longitudinal movement in respectively opposite directions; and means cooperating with said pair of bars for shifting one or the other of said bars and the pulley carried thereby in dependence upon the direction of rotation of said drum.

5. In an apparatus as recited in claim 4, the difference between the circumferential lengths of the stepped portions of said drum being equal to the additional cable length required to accommodate shifting of said bars.

6. In an apparatus as recited in claim 4, said last-mentioned means comprising drive means operatively connected to said drum for rotating the latter; a threaded spindle carried by said elevator means for rotation about its axis and operatively connected to said drive means to be driven thereby; a nut carried by said spindle for axial movement therealong during rotation of said spindle; and a pair of stop members respectively fixed to said bars, respectively located on opposite sides of said nut, and located in the path of movement of said nut to be engaged thereby for shifting said bars, respectively.

7. In an apparatus as recited in claim 4, said last-mentioned means comprising an auxiliary drum fixed coaxially to said first-mentioned drum for rotation therewith; a pair of additional cables respectively wound in opposite directions on said auxiliary drum; and bar means operatively connected to said additional cables to be shifted thereby and cooperating with said pair of bars for respectively shifting the same.

8. In an apparatus as recited in claim 1, said stepped portion having an intermediate cylindrical portion and an outer conical portion joined to an end of said cylindrical portion, said cylindrical portion of said drum corresponding to an intermediate position of said carriage means and the junction of said conical portion with said cylindrical portion corresponding to the beginning of the movement of said carriage means by said additional means.

References Cited in the file of this patent

UNITED STATES PATENTS

| | | |
|---|---|---|
| 1,828,307 | Been | Oct. 20, 1931 |
| 1,891,795 | Buettell | Dec. 20, 1932 |
| 2,626,065 | Sanders et al. | Jan. 20, 1953 |